June 28, 1932.    R. GORSUCH    1,865,367
METHOD AND APPARATUS FOR SIMULTANEOUSLY EMPTYING GLASS
TANKS AND REDUCING THE MOLTEN GLASS TO GRANULES
Filed March 5, 1930    2 Sheets-Sheet 1
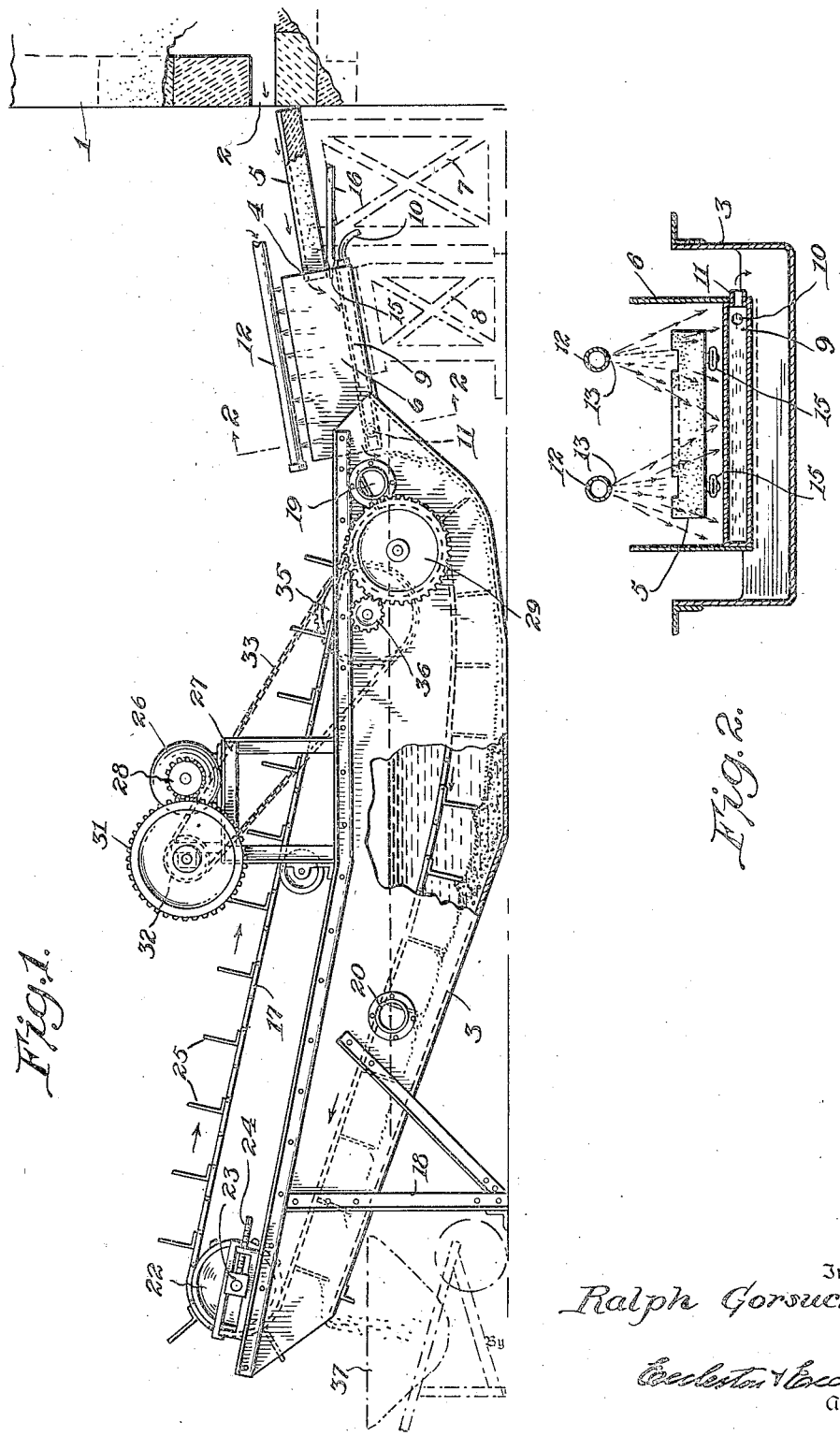
Inventor
Ralph Gorsuch
Eccleston & Eccleston
Attorneys June 28, 1932.   R. GORSUCH   1,865,367
METHOD AND APPARATUS FOR SIMULTANEOUSLY EMPTYING GLASS
TANKS AND REDUCING THE MOLTEN GLASS TO GRANULES
Filed March 5, 1930   2 Sheets-Sheet 2
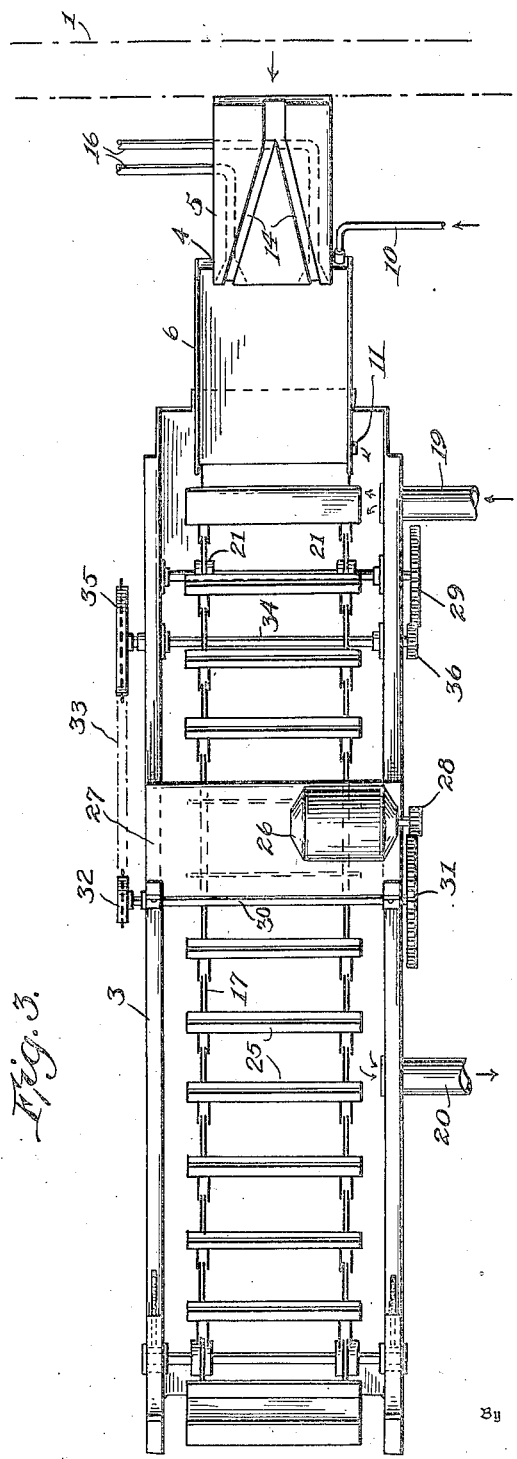
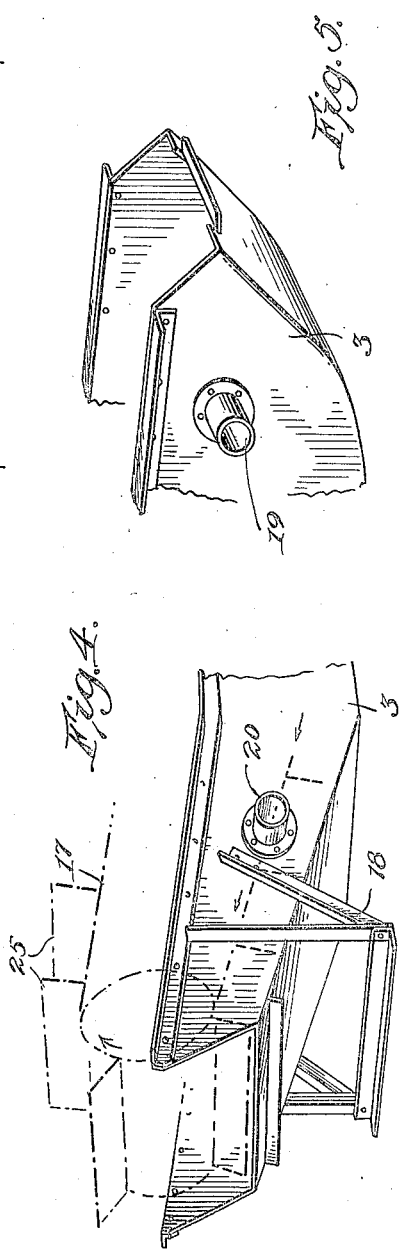
Inventor
Ralph Gorsuch Patented June 28, 1932

1,865,367

UNITED STATES PATENT OFFICE

RALPH GORSUCH, OF ZANESVILLE, OHIO, ASSIGNOR TO HAZEL-ATLAS GLASS CO., OF WHEELING, WEST VIRGINIA, A CORPORATION OF WEST VIRGINIA

METHOD AND APPARATUS FOR SIMULTANEOUSLY EMPTYING GLASS TANKS AND REDUCING THE MOLTEN GLASS TO GRANULES

Application filed March 5, 1930. Serial No. 433,415.

In the manufacture of glassware it quite frequently happens that one of the tanks of molten glass must be emptied of its contents for the purpose of rebuilding the tank or to permit renewal of worn parts. This necessity also arises where it is desired to use the tank for the production of glassware of a different color than that previously manufactured. The procedure in emptying a tank has heretofore generally been carried out by strewing sand on the factory floor and then allowing the molten glass to flow onto the floor, after which the glass was broken into lumps and then carried off to a grinding machine, which ground it to granulated form. It was then taken to the cullet pile to await remelting.

This procedure was both slow and expensive, and a primary object of the present invention is the provision of mobile apparatus which may be readily positioned at the tap hole of a tank and which will immediately convert the molten glass into finely divided particles, just as rapidly as the molten glass is allowed to run from the tank. The old steps of breaking the glass into lumps and then grinding them, are wholly eliminated.

Another object of the invention resides in the provision of a novel method of treating molten glass so as to more readily reduce it to a granular condition.

Other objects and advantages of the invention will be apparent from the following description when taken in connection with the accompanying drawings; in which Figure 1 is a side elevational view of the novel apparatus in operative relation with a tank, parts being broken away to more clearly disclose the construction.

Figure 2 is a transverse sectional view taken on line 2—2 of Figure 1, and looking in the direction of the arrows.

Figure 3 is a plan view of the apparatus, a portion of the associated tank being indicated in dotted lines.

Figure 4 is a fragmentary perspective view of the delivery end of the apparatus, parts being shown in dotted outline; and Figure 5 is a similar view of the receiving end of the apparatus.

Referring to the drawings in greater detail, the numeral 1 indicates a portion of a glass furnace of the continuous type; i. e., a furnace in which the glass batch is fed to the tank at one end and the refined molten glass is delivered at the other end to forming machines.

For the purpose of practicing the present invention one of the walls is provided with a tap hole 2, at the level of the tank floor, or may be so provided when it is desired to empty the tank, either for the purpose of repair or rebuilding or to permit the melting of glass of a different color from that already in the furnace.

Disposed adjacent the glass tank or furnace 1 is a metallic trough 3 which is operatively connected with the furnace 1 at the tap hole 2 by means of an inclined chute 4. This chute comprises two relatively adjustable sections 5 and 6.

The upper chute section 5 is preferably composed of refractory material and may be supported by any suitable framework or bracket 7. The lower section 6 of the chute 4 is preferably made of metal and is supported by framework 8 with its inner end disposed below the outer end of chute section 5 and in overlapping relation with respect thereto. The outer end of chute section 6 overhangs the adjacent end of the trough 3.

Section 6 of the chute 4 is preferably provided with a double-walled bottom which permits the circulation of a cooling fluid, such as water, therethrough. For this purpose, an inlet pipe 10 is connected to the one end of the bottom compartment and a discharge nipple 11 projecting into the trough 3 is connected to the other end. Thus, the water for cooling the chute flows directly into the trough.

This circulation of cooling fluid through the bottom of chute section 5 serves not only to cool the metal of which the section is formed, and thereby prevent sticking of the molten glass, but also to carry away some of the heat of the molten glass and thereby aid greatly in its cooling and solidification prior to its entrance into the trough 3.

As a further aid in chilling and solidifying the molten glass one or more water pipes 12 are provided. These pipes, which are disposed above the chute 4, are provided with perforations 13 in their lower side so as to produce a plurality of sprinkling jets for playing on the molten glass as it travels down the section 6.

To most expeditiously cool the molten glass by means of these jets of cold water it is essential that the stream of molten glass take the form of a thin layer in the chute section 6, and to accomplish this the refractory section 5 of the chute is shown as provided with the diverging channels 14. Obviously, however, this spreading movement of the molten glass stream may be accomplished in a variety of different ways, and the channels 14 are merely intended as illustrative of one construction which may be employed for this purpose.

It is, of course, desirable to speed up the travel of the molten glass along the chute 4 as much as possible and also to chill the glass as much as possible, and in the present embodiment of the invention this has been accomplished by the provision of spraying nozzles 15 (Fig. 2). These nozzles are connected to the discharge ends of water pipes 16 and are disposed in the space between the adjoining ends of the chute sections 5 and 6. These nozzles project sheets of cooling water down the chute section 6, which serve both to hasten the flow of molten glass and assist in chilling the glass. The water from the nozzles 15 is discharged into the trough 3 along with the glass as it reaches the end of the chute.

The trough 3 is made of steel plate or other suitable material and is preferably of an elongated design to adapt it to a traveling conveyer, which is indicated generally by the numeral 17. The outer end of the tank 3 is supported on braces 18 while the inner end may conveniently rest upon the factory floor so as to provide the inclined position indicated in Figure 1. Cooling water enters the trough 3 through an inlet opening 19 and may discharge or overflow through an outlet 20.

The conveyer 17 is of the endless chain type and is mounted on sprocket wheels 21 and 22 disposed at opposite ends of the tank. Sprocket wheels 22 at the rear end of the tank are preferably mounted on a shaft supported in bearing blocks 23, and screws 24 are provided for adjusting these blocks in the usual way so as to take up slack in the conveyer chains. Mounted on these chains is a series of transversely arranged flights or drags 25, which serve to carry the glass along the bottom of the trough to the exit end thereof.

Continuous motion may be imparted to the conveyer 17 by means of a motor 26 conveniently mounted on a frame 27 supported above the trough 3. Reduction gearing is, of course, provided between the pinion 28 of the motor shaft and the gear wheel 29 of the driving sprocket 21. This reduction gearing includes a shaft 30 on which is mounted a gear wheel 31 meshing with the motor pinion 28. On the opposite end of shaft 30 is fixedly secured a sprocket wheel 32 meshing with a sprocket chain 33. A shaft 34 paralleling shaft 30 is also mounted on the trough 3 and has secured to one end thereof a sprocket wheel 35 meshing with the chain 33, and by which it is driven. On the opposite end of shaft 34 is fixed a pinion 36 meshing with gear wheel 29. The conveyer or drag 17 is thus caused to travel continuously in the direction of the arrows (Fig. 1).

It will be understood that the trough 3 and the chute associated therewith may be readily moved about the factory floor from one tank to another as occasion may arise, and thus one of these devices may serve a large number of tanks.

Assuming that a glass tank is to be emptied of its charge, the present apparatus is set up in position as disclosed in Figure 1; it being understood that the adjustable chute sections 5 and 6 provide for suitable adjustments to accommodate the apparatus to glass furnaces situated at varying distances above the factory floor. Circulation of water is started through the trough 3 and through the various pipes 10, 12 and 16, as heretofore mentioned. Also, the circuit is closed through motor 26 and the conveyer 17 thus set in operation. The plug or refractory block is now removed from the tap hole 2 of the glass tank and the molten glass allowed to discharge into the chute 4. By reason of the diverging channels 14 in the refractory material composing chute section 5 the molten glass will discharge onto section 6 in two streams and will thus be caused to spread out into a thin layer as it travels toward the trough 3. The travel of the molten glass is expedited by reason of the substantially horizontal sheets of water projected onto the chute by the nozzles 15 and its heat is absorbed in large part by these sprays and by the downwardly projected sprays from pipes 12 as well as by the circulation of the cooling fluid in the double-walled bottom of the chute.

This rapid cooling of the sheet of molten glass sets up stresses in the outside layers of the heated glass and produces a compression pressure on the middle layers. These two forces occurring in the thin stream of glass tend to rupture it and reduce it to a mass of small granules. This rapid chilling of the glass is, of course, continued in the trough 3 and any glass which has not been previously reduced to a fine grain will be broken up by the paddles or flights 25 on the conveyer 17 and by the additional chilling action caused by its entrance into the body of circulating water in the trough.

Continuous movement of the conveyer 17 carries the granulated glass rearwardly along the bottom of the tank and causes it to be discharged from the rear end of the tank into a suitable receptacle; a wheelbarrow 37 being indicated in dotted lines in Figure 1 for this purpose. As heretofore mentioned, the rear end of trough 3 is supported in a plane substantially higher than the front end thereof; and inasmuch as the discharge outlet 20 for the cooling water is located in a plane below the rear end of the trough it will be apparent that the granulated glass leaves the trough 3 in a practically dry condition.

From the foregoing description taken in connection with the accompanying drawings, it will be apparent that there is disclosed herein a novel method and apparatus for handling molten glass in the course of emptying a modern glass furnace; whereby the operation is expedited, the cost is reduced, and the former steps of breaking up the glass into lumps and then grinding it, are wholly eliminated.

What I claim as new is:

1. Apparatus for reducing molten glass to granules suitable for remelting, including a trough, means for circulating water through the trough, means for freely feeding molten glass from a glass tank to the bottom of the trough, and a conveyer for continuously dragging the glass across the bottom of the trough and through the water therein.

2. Apparatus for reducing molten glass to granules suitable for remelting, including a trough, means for circulating water through the trough, means for freely feeding molten glass from a tank to the bottom of the trough, and a conveyer for continuously transporting the glass across the bottom of the trough and through the water therein and discharging the glass in granular form, the point of discharge being above the level of the water in the trough.

3. Apparatus for reducing molten glass to granules suitable for remelting, including a trough, means for circulating water through the trough, means for feeding molten glass from a tank to the trough, and an endless conveyer having flights for dragging the glass along the bottom of the trough through the water.

4. Apparatus for reducing molten glass to granules suitable for remelting, including a trough, water in said trough, a downwardly inclined chute for conveying molten glass by gravity from a tank to said trough, means for spraying water onto the glass while it is traveling along said chute, and means for dragging the glass along the bottom of the trough through the water therein.

5. Apparatus for reducing molten glass to granules suitable for remelting, including a trough, water in said trough, a downwardly inclined chute for conveying molten glass by gravity from a tank to said trough, means for projecting a stream of water along the bottom of the chute, and a conveyer for dragging the glass along the bottom of the trough and discharging the glass, the point of discharge being above the level of the glass in the trough.

6. Apparatus for emptying glass tanks and reducing the molten glass to granules, consisting of a trough, water in said trough, a two-part chute for conveying the glass by gravity from the tank to the trough, one part of the chute being formed of refractory material, the other part of the chute being formed of metal, means for spreading the glass into a thin layer over the metallic chute, means for spraying the glass with water as it travels down the metallic chute, and means for dragging the glass along the bottom of the trough through the water therein.

7. Apparatus for emptying glass tanks and reducing the molten glass to granules, including a trough, water in said trough, a two-part chute for conveying the molten glass by gravity from the tank to the conveyer, one part of said chute being formed of refractory material, the other part of the chute being formed of metal, means for circulating water through the bottom of the metallic chute, means for projecting a stream of water along the metallic chute, means for spreading the glass in a thin layer over the metallic chute, means for spraying the glass with water as it travels down the metallic chute, and means for conveying the glass through the water in the trough.

8. The method of emptying glass tanks and reducing the molten glass to granules, which consists of flowing the molten glass in a thin ribbon down a chute to a trough having water therein, projecting water onto the ribbon of glass as it flows down the chute, dragging the glass along the bottom of the trough through the water therein, and discharging the glass from the trough at a point higher than the water level therein.

9. The method of emptying glass tanks and reducing the molten glass to granules, which consists in flowing the glass by gravity down a chute, partly comminuting the glass as it flows down the chute by subjecting it to cold water, further comminuting the glass by discharging it into a trough having water therein, and further comminuting the glass by dragging it along the bottom of the trough through the water.

10. The method of emptying glass tanks and reducing the molten glass to granules, which consists in discharging the glass by gravity into a trough having water therein, and mechanically dragging the glass along the bottom of the tank through the water.

RALPH GORSUCH.